United States Patent [19]

Knepper

[11] Patent Number: 5,229,704
[45] Date of Patent: Jul. 20, 1993

[54] CURRENT SUPPLY ARRANGEMENT

[76] Inventor: Hans-Reinhard Knepper, Pfalzgrafenstr. 80, D-4200 Oberhausen 11, Fed. Rep. of Germany

[21] Appl. No.: 310,727

[22] PCT Filed: May 5, 1988

[86] PCT No.: PCT/CH88/00085
§ 371 Date: Mar. 6, 1989
§ 102(e) Date: Mar. 6, 1989

[87] PCT Pub. No.: WO88/09076
PCT Pub. Date: Nov. 17, 1988

[30] Foreign Application Priority Data

May 6, 1987 [CH] Switzerland ............... 1727/87

[51] Int. Cl.[5] ............... H02J 7/00; H01M 10/46
[52] U.S. Cl. ............... 320/2; 320/43; 320/48
[58] Field of Search ............... 320/44, 43, 20, 21, 320/39, 40, 32, 2, 48

[56] References Cited

U.S. PATENT DOCUMENTS

| | | | |
|---|---|---|---|
| 4,194,146 | 3/1980 | Patry et al. | 320/44 |
| 4,289,836 | 9/1981 | Lemelson | 429/61 |
| 4,380,726 | 4/1983 | Sado et al. | 320/48 |
| 4,392,101 | 7/1983 | Saar et al. | 320/39 X |
| 4,553,081 | 11/1985 | Koenck | 320/39 X |
| 4,555,451 | 11/1985 | Harrod et al. | 429/7 X |
| 4,560,937 | 12/1985 | Finger | 320/39 X |
| 4,639,655 | 1/1987 | Westhaver et al. | 320/40 X |
| 4,820,966 | 4/1989 | Fridman | 320/48 X |

*Primary Examiner*—R. J. Hickey
*Attorney, Agent, or Firm*—Louis Weinstein

[57] ABSTRACT

In order to reliably measure the performance of a battery over a period of time, for example, to verify compliance with warranty conditions, the battery is inseparably connected in a casing with a charging and monitoring unit which monitors the condition of the battery and charges the battery according to a charging sequence selected in accordance with the conditions detected. The charging and monitoring unit also protects the battery from deep-discharges and from being short-circuited.

2 Claims, 3 Drawing Sheets

CURRENT SUPPLY ARRANGEMENT

BACKGROUND OF THE INVENTION

The present invention pertains to a power supply system with at least one rechargeable battery, with a charging and monitoring unit, and with load current outputs and a charging feed input.

An auxiliary power supply system is known from FR-A-2,220,211, in which a rechargeable battery and a charging unit together with means for monitoring the operating state of the power system are housed in a multi-part housing. So that this auxiliary power supply system can provide help in the case of a breakdown in devices whose batteries are depleted, load current outputs are provided on the auxiliary power supply system as well as a mains connection so that the battery system's own auxiliary system can be charged via the mains and the charging unit provided in the housing.

A portable power supply system for battery-operated or accumulator-operated devices for which no nearby mains connection is available is described in GB-A-2,028,022. In the power supply system described therein, a battery, a charging unit, and a monitor for indicating the operating state of the system are again provided in and a multi-part housing; a mains connection is also provided so that the charging unit mentioned can charge the system battery.

As in the case of batteries and charging/monitoring units used separately, the problem of warranty claims also exists when these portable battery and charging-/monitoring units are combined into a unit in a common multi-part housing. For the producer of these batteries, it is extremely difficult, if not impossible, to test batteries which have been returned in defective condition within the warranty period for fulfillment of the warranty performance claims to determine whether or not the batteries have in fact been used properly, a condition normally required for the satisfaction of the claims mentioned. The larger the battery systems being used, the more acute this problem is becoming, which is in line with the current trend toward replacing more and more fuel-powered systems with electrically powered ones, such as vehicles with electric motors as the drive source.

BRIEF DESCRIPTION OF THE INVENTION

The present invention has the purpose of solving the problem that it is difficult or impossible to discover how batteries, such as those being examined to determine the justification of warranty claims, have previously been used. This is solved in a power supply system of the type described above through the design which is characterized in that the battery and the charging/monitoring unit are combined structurally in such a way that they cannot be separated without the destruction of the means utilized to connect, and in that the monitoring unit is supplied with electrical power from the battery.

In other words, the charging/monitoring unit is assembled inseparably with the associated battery or group of batteries, which provides the opportunity of determining at any time the operating conditions which the battery has experienced.

In the case of power consumers operated by individual batteries or, in the case of large electric power consumers, operated by sets of batteries, it is also conventional to remove the power supplies from the electric power consumers for recharging and to charge them again in ventilated rooms or to use the electric power consumers to drive the power supplies to these ventilated rooms for recharging.

It is essential to provide very effectively ventilated rooms, because, when batteries of this type, such as lead batteries with a liquid electrolyte, which generate gas during charging, are recharged, hydrogen is formed, which must be exhausted so that it cannot combine with atmospheric oxygen to produce dangerous concentrations of oxyhydrogen gas. Batteries have become known recently which produce almost no gas when charged. These include batteries with a gel electrolyte, such as the lead batteries with a gel electrolyte sold under the name "Dryfit Traction Block" or in general under the name "Dryfit" batteries by Akkumulatorenfabrik Sonnenschein GmbH in Berlin or by Sonnenschein Batteries, Inc., Cheshire, Conn., U.S.A. With respect to this technology, reference can also be made, for example, to DE-A-3,521,200.

So that the power supply mentioned can be put into charging mode without the need to remove it from the power consumer (i.e., load) which it operates so that it can be subjected to a charging operation in a ventilated room, that is, so that the charging operation can be carried out anywhere, it is also proposed that the battery in the power supply system mentioned is a battery which can be charged in an at least nearly gas-free manner, preferably a lead battery with a gel electrolyte. In this way, the possibility is also created that the connection between the charging/monitoring unit and the battery can be accomplished by a jacketing or encapsulating process, such as by casting, which gives the power supply system according to the invention a compact appearance and solves the problem posed by the invention in an optimum manner. Thus, power supplies of the type indicated, together with one or more of the batteries mentioned, which can be charged in an at least nearly gas-free manner, can be permanently installed in a corresponding compartment in the power consumer and can be permanently wired on the output side to the power consumer so that only terminals for the charging feed current need extend to the outside on the power consumer.

It is also known that one of the essential parameters for identifying the condition of batteries is the amount of load current which has flowed since the battery was new or since the most recent charging process; this parameter is expressed in Ah, and is compared with the nominal Ah value stated by the producer. This parameter is one of the parameters which can be evaluated to identify the condition of the battery and its duty history. For this reason, it is also proposed that the charging-/monitoring unit include a load current integrator.

It is known in general from, for example, FR-A-2,507,016 that the load current of a battery can be recorded by integral-analog operations. This does not in itself solve the problem mentioned above, however, unless it is ensured by means of the invention that the monitoring unit—together with the load current integrator—is connected inseparably to the battery in question and that the load current integrator cannot be easily reset, because otherwise the possibility of identifying the electrical operating history experienced by the battery is not reliably ensured.

It is also known that, depending on the condition of the battery, the charging process can also be carried out either with a regulated charging voltage or with a regulated charging current or even with both in a predetermined temporal sequence.

For this reason, it is also proposed that the charging-/monitoring unit include at least one preferably controlled charging current source and/or controlled voltage source.

To ensure in addition that an operator, when charging a battery, will not have to inform himself concerning optional charging procedures to be selected on the basis of the battery condition or to initiate the corresponding type of control, it is also proposed that the charging/monitoring unit include a charging program control unit, which controls the temporal sequence with which the charging current source and/or charging voltage source to the battery are turned on or which controls the temporal sequence of the charging voltage and/or charging current.

In a preferred embodiment, it is also proposed that the control unit mentioned include storage means for at least two control sequences and that the control unit drive the charging current and/or charging voltage source in correspondence with the stored sequences or that it drive the charging voltage and/or the charging current in a corresponding manner.

To achieve in addition the goal that an operator would not need to monitor the instantaneous condition of the battery either, which type of monitoring can be done quite easily by reading the voltage indicators and/or. Ah indicators provided, it is also proposed that elements for recording physical variables which identify the instantaneous condition of the battery be provided on the charging/monitoring unit. This recording makes it possible to reconstruct in particular the operating history of the battery at any time, including the relevance of that history to possible faulty operating conditions, for which purpose in particular the duty time of the battery and/or the cumulative operating time and/or the number and possibly the manner and type of charging operations experienced and/or deep-discharges experienced, short-circuits, experienced, etc., are recorded as suitable physical variables and stored for output.

These recording elements can be connected to a selector, which drives a charging program control unit for implementing a corresponding charging sequence in correspondence with the identification information supplied to it by the elements. For this last-mentioned purpose, it is proposed in particular that a discriminator unit be connected downline from the load current integrator. This discriminator unit detects when predetermined Ah values are reached on the output side. It is also proposed that, on the output side, the discriminator unit control the type and manner of a subsequent charging process.

For the control of the charging process, the degree to which the battery has been used is also an essential parameter. When the selector is controlled, as it can be, by at least some of the recorded physical variables used for identification, the goal is achieved that the charging state of the battery can be inferred directly from the actual amount of load current which has passed up until that point and that, in accordance with this information in particular, charging control sequences can be implemented which are appropriate to the instantaneous state of the battery.

For the electrical operation of the electrical and/or electronic components of the system according to the invention, it is also proposed that the battery voltage electrically feed the other components of the charging-/monitoring unit by way of a voltage controller.

When a voltage controller of this type is provided, which supplies a regulated output voltage which is lower than the allowable battery voltage, the electric feed indicated is ensured over the entire value range which the battery output voltage is allowed to reach.

Furthermore, a battery or a set of batteries should not be operated so long without recharging that a so-called deep-discharge occurs.

When deep-discharge states are reached, the service life of a battery of this type is much shorter than that of a battery which has never undergone any such deep-discharges. The same is true of battery short-circuits.

To prevent this, it is also proposed that the charging-/monitoring unit include a means of deep-discharge prevention and/or a means of short-circuit prevention.

This can be realized in a simple manner by installing a threshold value-sensitive unit downline from the above-mentioned load current integrator; this unit cuts the connection between the battery and the power consumer on the output side when an Ah threshold value is reached. The short-circuit state can be detected by monitoring the rate at which the load current integral changes over time or by means of a direct current measurement.

Furthermore, so that the instantaneous condition or the history of a battery can be estimated with the greatest possible accuracy, it is essential to know, for example, how often and/or under what preceding instantaneous conditions it has been recharged and/or how much power has been consumed over what period of time and/or at what outside temperatures all this has occurred and/or how long the battery has been in operation altogether.

To take all this into account, it is now proposed additionally that the charging/monitoring unit include storage elements for the electrical and/or environmental history of the battery. It is preferable for these storage elements to be removable and/or externally readable, so that the data can be analyzed again later to reconstruct, for example, what has happened to the battery.

Whereas preferably programmable read-only memories PROMs or EPROMs are used as the storage medium for the charging control sequences, read-and-write memories are used for storing the historical information mentioned. These memories are filled with measurement values from the power supply system and then are read as needed, or they can be read and analyzed at some other location after the physical removal of the storage medium.

It is also proposed that control and measurement signal lines be provided between the system and the outside and/or to provide corresponding terminals.

The control signal lines can be, for example, a control line for initiating a charging process, a reset signal line to reset the means of deep-discharge prevention after it has been actuated after a recharge, etc. The measurement signal lines can include lines for Ah data, for the instantaneous voltage, etc., depending on which information is to be made available to the operator.

It is also proposed that the charging/monitoring unit include a microprocessor, by means of which the opportunity is provided in a simple manner for executing the functions according to the invention, especially the recording and storing of the above-mentioned historical data.

Because, as mentioned, the charging/monitoring unit and battery according to the invention are combined structurally into an inseparable unit, it is possible in many cases to omit the various charging programs and, because the same battery is always charged by the same charging unit, the latter can be provided with a fixed charging voltage for the battery.

Now it is also desirable in many cases in which two or more power supply systems of the type indicated are electrically connected, that is, in series or in parallel, to ensure that only specified, suitable power supply systems can be connected to each other. This is also true because, in the case of these electrical connections between the individual power supply systems, an interaction occurs during operation, which is of such a kind that, for example, when warranty claims are being investigated, it must be known to which other systems a certain system was electrically connected. This is accomplished in a simple manner by providing, on the power supply system according to the invention, means of recognizing additional systems electrically connected to this system.

In particular it is proposed for this purpose that the system be designed such that each power supply system is identified by a code and means are provided to compare the stored codes to prevent their connection if the comparison operation shows that the power supply systems are incompatible.

The result thus achieved is that, when two or more power supply systems are electrically connected, each of the participants reads the code of the other participating systems, compares it with stored codes, and refuses operation when the other systems connected to the specific system under consideration fail to match the stored coding information. This coding can be transmitted by initiating a sequence of electrical signals, such as digital signals, for example, at predetermined time intervals, such as on the hour.

BRIEF DESCRIPTION OF THE FIGURES

The invention is explained below in exemplary fashion on the basis of the FIGURES.

Figure 1:
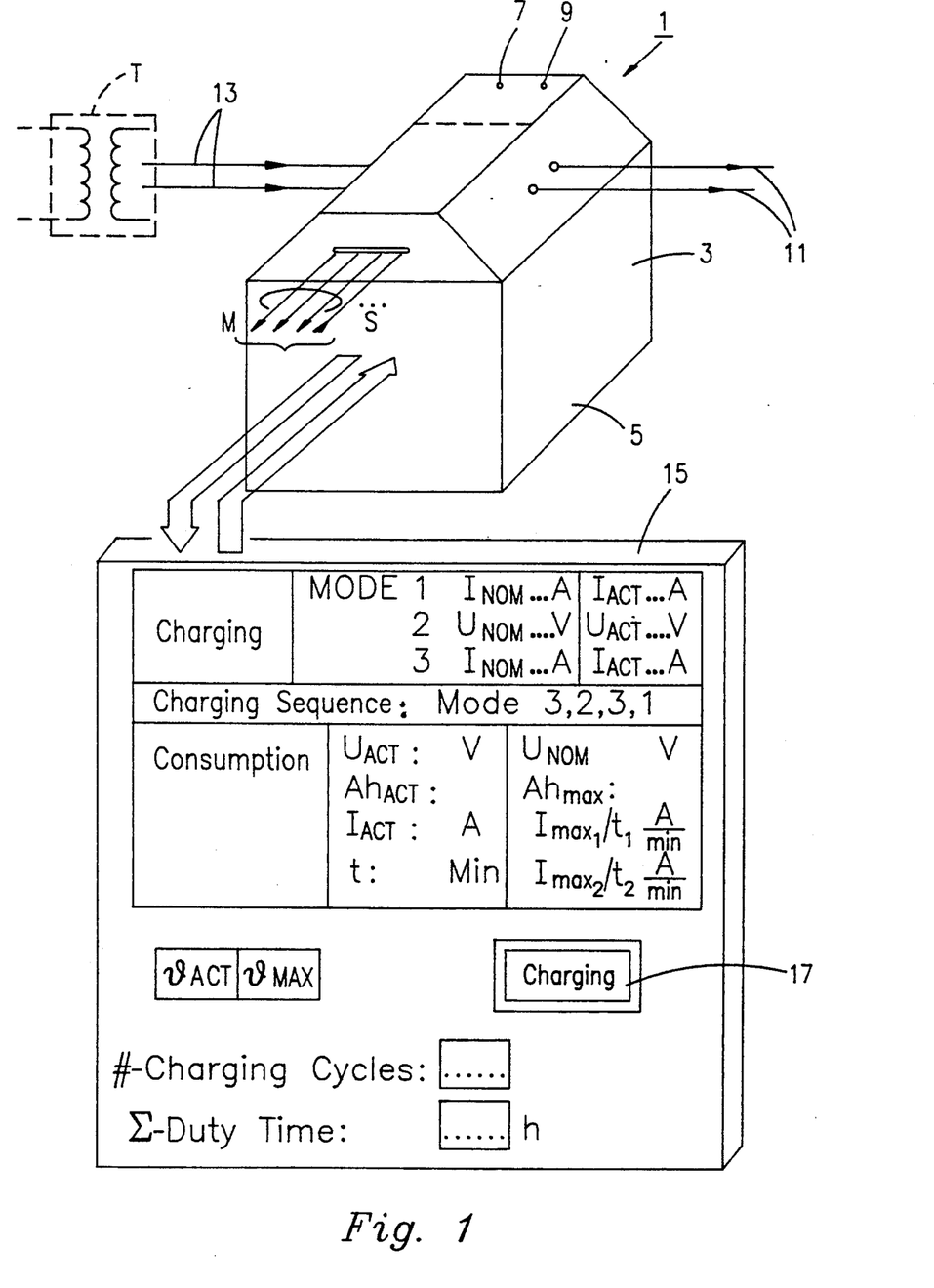
FIG. 1 shows a schematic diagram of a power supply system according to the invention.

FIG. 1 shows a power supply system 1 according to the invention. In a housing 3, preferably an integral housing formed by chemical bonding, casting, or encapsulating, which cannot in principle be opened without destroying certain of its parts, such as lead seals on connecting screws, a battery section 5 is provided; this section has one or more batteries, preferably lead batteries with a gel electrolyte, which, as already mentioned, are sold, for example, under the name "Dryfit" by Sonnenschein. In an upper section 7 of housing 3, which preferably cannot be opened in a non-destructible manner, a charging and monitoring unit for the batteries in section 5, to be described later, is provided, this unit thus being permanently connected to the batteries. Upper section 7 can conveniently have a removable cover 9, through which, however, access can be gained only to the charging/monitoring unit provided therein so that data can be read: The inseparable connection between this unit and the battery remains intact.

Load lines ll lead from the one-piece housing (the batteries and the charging/monitoring unit mentioned can be encapsulated together) to a consumer of electric power (i.e., a load). Charging inputs 13 lead to the charging/monitoring unit. If these charging inputs 13 are inputs for connection to the mains, an AC/DC converter must obviously be provided on the charging/monitoring unit to convert the alternating electrical mains signal into a DC charging signal for the intended batteries. In a manner known in itself, a transformer is then provided in upper section 7, followed by a rectifier circuit.

If it is preferred for weight reasons to mount the transformer T outside the unit indicated, as shown in broken line, charging inputs 13 are then inputs which are already supplied with a DC signal or, if the rectifier circuit with a subsequent smoothing circuit is integrated into the unit indicated, they are terminals for providing an alternating current lower than the mains voltage.

In this minimal configuration of the power supply system 1 according to the invention, therefore, only charging terminals 13 and load terminals ll are provided.

In a more highly elaborated variant, measurement signal lines M and/or control signal lines S are conducted outward from the charging/monitoring unit, or terminals A are provided for this purpose. A display and control panel 15 is provided on an electric current consumer in which the power supply system according to the invention is installed; this panel displays, for example, the following information and makes possible the following control operations:

Charging button 17 is used to initiate a charging cycle for the battery or batteries provided. Then charging is carried out automatically at a fixed charging voltage or current or, as will be described below, possibly as a function of the instantaneous state of the battery in accordance with various stored charging current/voltage sequences. A sequence of this type can consist of various mode components. In Mode 1, a nominal charging current appears on panel 15; this value corresponds to a nominal charging current previously stored in the charging/monitoring unit. Next to this is the actual charging current value to be monitored, which is measured by the charging/monitoring unit. The data with respect to Mode 2 are displayed correspondingly, i.e., a previously stored nominal charging voltage and a measured actual charging voltage. The same applies to the third and any additional charging modes provided. The charging sequence is automatically assembled from the provided modes on a case-by-case basis and then displayed.

In addition, the following information can be shown on panel 15 under the heading "consumption," for example: the nominal battery voltage, previously stored; the actual battery voltage; the number of ampere-hours $Ah_{actual}$ recorded since the beginning of operation or since the most recent charging process; and the nominal number of ampere-hours. As will be illustrated below, it is also possible for the actual amount of current consumed to be displayed in addition to the previously stored maximum allowable amount of current which can be consumed, this information being related to periods of time during which such currents are allowed to be consumed. For example, in the case of the maximum allowable values, it can be shown that a first value $I_{max1}$ may flow for a time $t_1$, that a second value $I_{max2}$ may flow for a time $t_2$, etc. The actual-value column shows what current has already been consumed during what period of time. Furthermore, panel 15 can also show temperature data, such as the temperature of the battery $\theta_{actual}$ and, as a comparison value, the maximum allowable battery temperature $\theta_{max}$. In addition, it is also preferable for the number of previous charging cycles and the cumulative battery operating time to be displayed.

Although, and as will be described further below, the charging/monitoring unit provided, especially in a preferred embodiment, decides automatically and in accordance with the instantaneous condition of the battery whether and how charging should be carried out and then automatically controls this process when button 17 is pushed, the data on panel 15 makes it possible, if necessary, to obtain optimum information concerning battery conditions, at least for maintenance work on the consumer system. A panel of this type can also be omitted, except for charging button 17, if it is not intended that the operator be informed in such extensive detail. Such an intention may derive from the conviction that the operator, even when properly informed, would not be able to draw the proper conclusions from that information. A panel of this type can, however, be provided at a location in the current-consuming system which is inaccessible to the normal operator, i.e. at a location for service personnel, for example.

Figure 2:
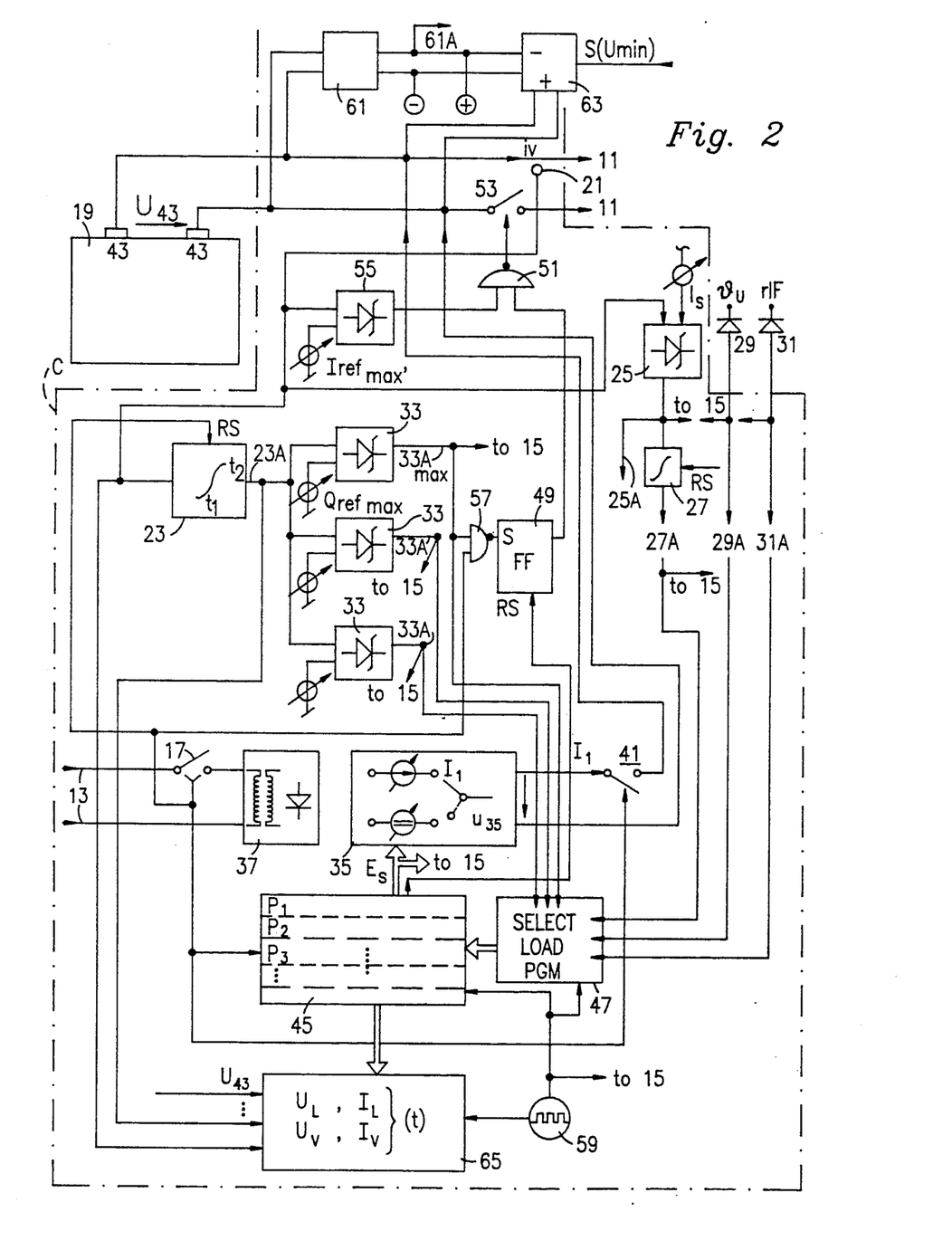
FIG. 2 shows a variant of the power supply system according to the invention on the basis of a simplified function block diagram.

FIG. 2 shows the design of a charging/monitoring unit according to the invention in simplified form on the basis of a function block diagram. Terminals 43,43 of a battery 19 or a set of batteries, preferably a battery which can be charged with virtually no production of gas, such as a lead battery with gel electrolyte, are coupled to outputs 11 of the current-consuming system.

Load current $i_v$ is measured by means of a current measuring device 21, and a signal corresponding to this current is sent to an integration unit 23. Thus a signal in Ah corresponding to the time integral of the load current $i_v$ appears at an output 23A. This signal is representative of the amount of current (charge) which has flowed from the battery since the last time integration unit 23 was reset.

Integration unit 23 can include a first integrator, which cannot be reset and which integrates the load current from the time at which the battery was first put into service, and/or an integrator which is reset each time the battery is recharged, as shown in FIG. 2. Furthermore, the signal corresponding to the instantaneous load current iv is sent to one or more threshold-sensitive units, such as comparators 25, which respond on the output side when load current $i_v$ reaches a limit value $i_s$ set thereon. Reaching or exceeding such a limit value $i_s$ is indicated at output(s) 25A. This indicator signal at output 25A is sent to an integration unit 27, which can be reset when, for example, a charging process is initiated.

At the output of integration unit 27, therefore, a signal which indicates how long the reference value $i_s$ indicated has been exceeded by the load current $i_v$ appears as soon as reference value $i_s$ is exceeded by the load current. In addition, a temperature measuring device 29, for example, and a measuring device 31 for the relative humidity, as shown schematically, are installed near battery 19. They provide output signals to the corresponding lines 29A and 31A. The instantaneous condition of battery 19 is documented with greater or lesser accuracy as a function of the complexity of the system by the provisions for recording the amount of current which has passed since the start of operation of battery 19 and/or since the most recent charge by integration unit 23 and for recording the number of times when predetermined limit current values $i_v$ were exceeded, as indicated at output 25A; the data concerning the length of time these limit current values $i_v$ were exceeded; and, for example, the temperature and relative humidity. One of the limit current values can be defined as a short-circuit indicator, and the current-consuming system can be cut off when this value is reached.

Output 23A of integration unit 23 is sent to several threshold-sensitive units 33, to which either threshold value signals or reference signals $Q_{ref}$ are switched. When the Ah value registered at integration unit 23, a value which corresponds to the time integral of the load current, reaches one of the reference values $Q_{ref}$ set on threshold-sensitive units 33, an indicator signal then appears on the output side, i.e., at outputs 33A.

Thus one or more of the following signals, which identify the instantaneous condition of battery 19, are available:
- signals which indicate that predetermined values have been reached by the load current time integral at outputs 33A;
- signals which indicate whether and how long predetermined limit currents have been reached or exceeded by load current $i_v$ at output(s) 27A;
- a signal which indicates the instantaneous temperature of the battery at output 29A; and
- a signal which indicates the relative humidity in the environment of battery 19 at output 31A.

For the charging of battery 19 a charging current source/charging voltage source 35 is provided, which can be switched between a current-source mode and a voltage-source mode. In current-source mode, unit 35, regardless of its output voltage $u_{35}$, supplies one or more predeterminable charging currents $I_l$, whereas, in voltage mode, unit 35, regardless of charging current $I_l$, supplies one or more predeterminable voltage values $u_{35}$. A transformer and rectifier unit 37, which can be either integrated with power supply system 1 according to the invention as shown in FIG. 1 or separate therefrom and which can be connected by way of charging button 17 and lines 13 to the supply mains, is connected upline from current source/voltage source unit 35. On the output side, current source/voltage source unit 35 is connected by way of a switch 41 to terminals 43 of battery 19. Current source/voltage source 35 also includes control inputs $E_S$.

How long unit 35 is operated in which mode and at what values of charging currents $I_l$ or charging voltage $u_{35}$ is controlled at these control inputs $E_S$. Control inputs $E_S$ are connected to the outputs of a charging program control unit 45. Several charging sequences or charging programs are stored therein. A program of this type can be set up as follows by way of example: charging at a first preset constant charging current $I_{l1}$ for a predetermined number of minutes $t_1$, then charging at a preset charging voltage $u_{35}$ for an additional number of minutes $t_2$, then again charging at another preset constant charging current $I_{l2}$ for another period of time $t_3$, etc. Which of these charging programs $P_1$, $P_2$, etc., actually controls current-source/voltage source unit 35 is determined by a selector 47. Basically, the signals which identify the condition of battery 19 are sent to this selector; in FIG. 2 these are the output signals of threshold-sensitive units 33 and the signals at lines 27A, 29A, and 31A. On the basis of predetermined decision criteria, selector 47 determines which of the charging programs P through $P_x$ stored in charging program control unit 45 is to be run by current source/-voltage source unit 35 when charging button 17 is pushed to initiate a charging process.

As soon as the load current time integral corresponding to the signal at output 23A of integration unit 23 reaches a preset maximum value corresponding to $Q_{ref.\ max}$, which corresponds to the point at which the maximum available battery capacity has been reached, a bistable unit 49 is set by way of output $33A_{max}$ of the corresponding threshold-sensitive unit 33 and an OR circuit 57; this bistable unit opens a load-side interrupter switch 53 by way of an OR gate connection 51 on the output side, with the result that battery 19 is cut off from the load. Via OR circuit 51, furthermore, disconnect switch 53 is also actuated when load current $i_v$ reaches a maximum value corresponding to a maximum load current $I_{ref/max}$, which can be set on a comparator 55. Thus battery 19 is protected from deep-discharge and from short-circuiting. In addition, bistable unit 49 is always set by way of this OR gate 57 and thus disconnect switch 53 is opened when charging button 17 is actuated, by which means the battery is cut off from the load during the charging process.

Bistable unit 49 is reset after the completion of a charging process by means of a control signal RS, which is transmitted by charging program control unit 45 after the completion of a corresponding charging program $P_x$.

The instantaneous charging mode and the mode sequence selected for the charging process, that is, the charging program and the charging current or charging voltage, are indicated by charging program control unit 35 on the displays of panel 15 described according to FIG. 1; then the time integral of the load current and the load current itself from the output of integration unit 23 and other information of interest such as that from the output of one or more of the threshold-sensitive units 33 or from outputs 25A, 27A, 29A, and 31A are displayed. The timing of the displays on panel 15 of program control unit 45 and of selector 47 is controlled by a timer 59.

So that the various electric and electronic components can be supplied with power independently of the instantaneous output voltage of battery 19, battery terminals 43 are connected to a constant-voltage controller 61, at the outputs 61A of which a controlled, constant output voltage appears as a feed voltage for the various components provided. Output 61A can be connected in addition to a comparator 63, where the controlled constant voltage is compared with the output voltage of battery 19 at terminals 43 and at the output of which a signal $S(U_{min})$ appears when the battery voltage reaches or falls below a predetermined minimum value.

So that the history of battery 19 in terms of its load data, charging data, temperature, etc., can be called up and analyzed at any time, such as when a problem occurs, it is proposed as shown in FIG. 2 that historical memory 65 be provided. Load current measurement signals from current measuring device 21, and from a battery voltage measuring device (not shown), a voltage measurement signal, the output measurement signal of load current integrator 23, in addition to maximum currents and limit currents (not shown) from outputs 25A and 27A, respectively; environmental temperature conditions from output 29A; possibly the course of the relative humidity from output 31A; and the outputs of threshold-sensitive units 33, for example, are sent to this memory, and the corresponding data are stored throughout the entire service life of a battery 19 at a rate determined by timer 59. In addition, the information concerning when and how battery 19 has been charged is also set to historical memory 65 by charging program control unit 45. By means of the data stored in historical memory 65, it is possible to analyze what has happened to battery 19 at any time so that a search can be made, for example, for the causes of a possible breakdown.

Specifically, it can be recorded, for example, how often battery 19 has been charged by using a counter (not shown) to count the number of times charging button 17 has been actuated and to keep this information ready for call-up in historical memory 65. It can also be recorded how often a deep-discharge warning has appeared at output $33A_{max}$ by means of a counter (not shown) and to store this information also in memory 65. The same applies to the recording and storage of short-circuit warnings, indicated by comparator 55. The accumulated operating time of the battery is recorded, for example, by starting up a time counter when the load current is being measured by measuring device 21.

The entire charging/monitoring system is preferably realized, as shown in broken line C, by means of a microprocessor or microcomputer.

Figure 3:
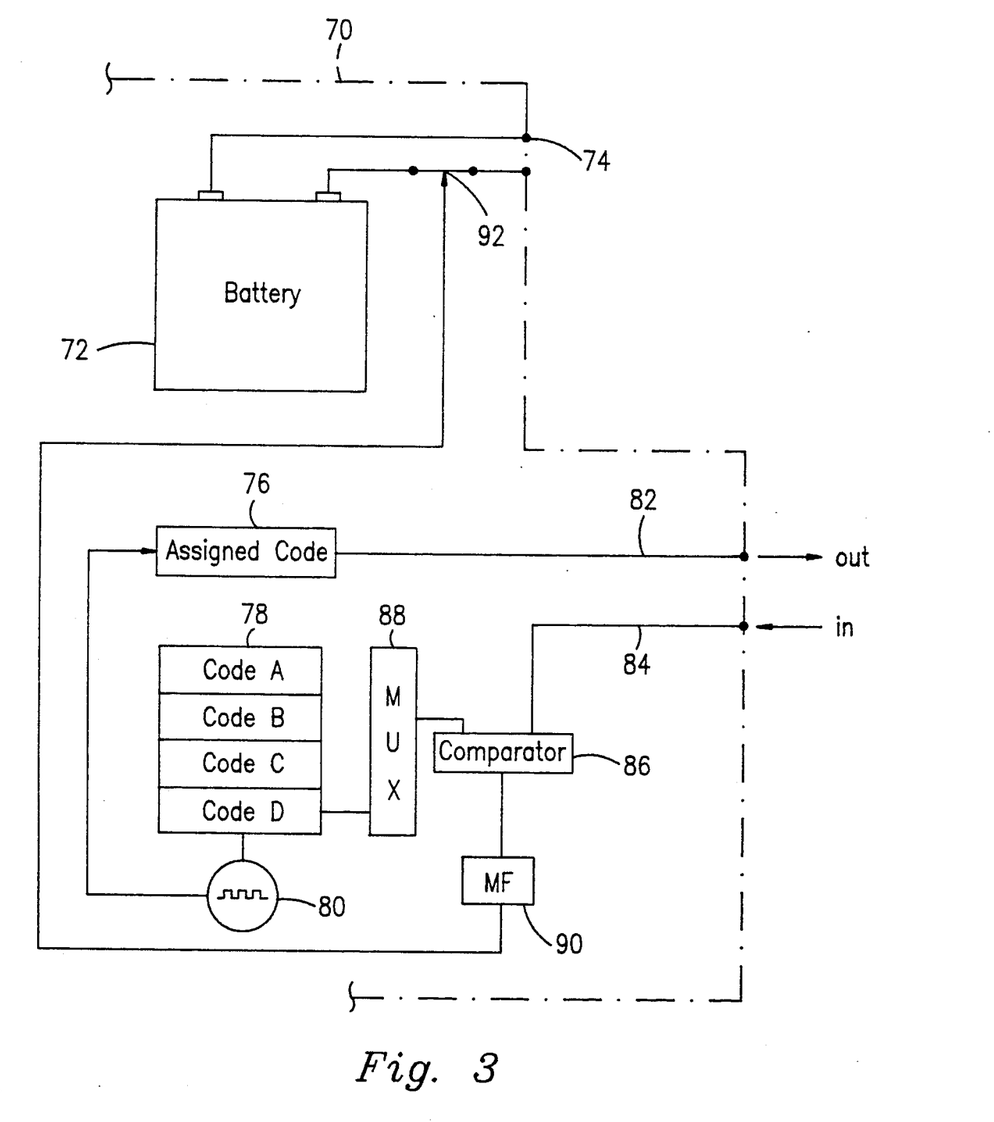
FIG. 3 shows a section of an additional variant according to FIG. 1 or FIG. 2 in the form of a function block diagram.

FIG. 3 shows another design variant of the power supply system according to the invention. Housing 70 (shown in dashed-line fashion) encloses a battery 72, which is joined inseparably according to the invention to the charging/monitoring unit, which is designed as shown in FIG. 2, for example, except that, in FIG. 3, for the sake of clarity, only the elements additionally provided in this embodiment are illustrated. The terminals of battery 72 are connected to load current outputs 74. In the monitoring unit a memory 76 is provided, preferably an EPROM, wherein a code belonging to the power supply system in question is recorded. In an additional memory 78, such as another EPROM, at least one additional code is stored; according to FIG. 3, four codes A-D, for example, are stored, which correspond to the permanently assigned codes of additional power supply systems which can be connected electrically to the power supply system in question in a reliable manner. The two or more power supply systems can be connected together electrically in a manner known in itself either in series or in parallel. The battery's own assigned code is sent from memory 76 to an output terminal 82 and sent from there to one or more additional power supply systems at predetermined time intervals under the control of a timer 80, which is shown schematically. In a corresponding manner, the assigned code of another connected power supply system is sent out and is received by the power supply shown in FIG. 3 by way of an input terminal 84 and routed to a comparator 86. Then all the codes stored in memory 78 are compared in sequence in a multiplexer 88 with the code sent to input terminal 84. If the code sent to terminal 84 agrees with one of the codes stored in memory 78, an element connected downline from comparator 86, such as a monoflop element 90, remains permanently set and keeps a switching element 92 in the load current line between terminals 74 and battery 72 closed.

If the code sent to terminal 84 does not agree with any of the codes stored in memory 78, the load is cut off from the power supply system by the opening of switching element 92.

It is thus ensured that, when a device is being operated by a combination of several power supply systems connected together, only the combinations allowed in a specific case can act on the load. It is obvious that the transmission of the corresponding codes back and forth between the power supply systems can be conducted via individual connecting lines connected to terminals 82 and 84, but use can also be made of known modulation techniques to accomplish these code transmissions via the load current lines connected together for the combination mentioned, that is, via terminals 74. The exchange of the identification codes occurs at predetermined time intervals, such as every 15 minutes or, if necessary for reasons of operating safety, at shorter intervals, such as every 10 seconds. The codes are transmitted, for example, on the basis of a serial transmission of digital data.

What is claimed is:

1. A power supply system with at least one rechargeable battery, charging/monitoring means powered by said battery, said battery having load current outputs, and a charging feed input coupled to said charging monitoring means, characterized in that coupling means are provided for electrically coupling the battery and the charging/monitoring means and housing means enclosing the battery and charging/monitoring means such that they cannot be separated without the destruction of the housing means; storage means for storing a fixed code, means for selectively transmitting the fixed code to a system output terminal; additional storage means for storing a plurality of additional fixed codes; input means for reading a code into the system responsive to a second system identified by said last-mentioned code being coupled thereto; means for comparing the code identifying the second system with the additional fixed codes in said additional storage means; and means for disconnecting the load terminals of said system when the output of said comparing means indicates that the compared codes do not agree.

2. A power supply system with at least one rechargeable battery, charging/monitoring means powered by said battery, said battery having load current outputs, and a charging feed input coupled to said charging /monitoring means, characterized in that coupling means are provided for electrically coupling the battery and the charging/monitoring means and housing means enclosing said battery and charging/monitoring means such that they cannot be separated without damaging the housing means;

code identifying means for identifying the code of a second power supply system to be connected to the system and means to prevent said system from being connected to said second power supply system when the code identifying means indicates that the system attempting to be connected are not compatible.

* * * * *

UNITED STATES PATENT AND TRADEMARK OFFICE
CERTIFICATE OF CORRECTION

PATENT NO. : 5,229,704
DATED : July 20, 1993
INVENTOR(S) : Knepper

It is certified that error appears in the above-indentified patent and that said Letters Patent is hereby corrected as shown below:

Column 1, line 26, after "in" delete "and"

Column 1, line 26, after "housing;" insert --and--

Column 6, line 3, change "II" to --11--

Column 6, line 24, change "II" to --11--

Column 7, line 51, change "iv" to --$i_v$--

Column 11, lines 25-26, change "charging monitoring means" to --charging/monitoring means--

Column 12, line 29, change "system" to --systems--

Signed and Sealed this

Twenty-sixth Day of July, 1994

Attest:

BRUCE LEHMAN

*Attesting Officer*  *Commissioner of Patents and Trademarks*